Nov. 15, 1966   P. E. C. RICHARDSON   3,285,567
AXIAL FLOW TURBINES AND COMPRESSORS
Filed Nov. 16, 1964   2 Sheets-Sheet 1
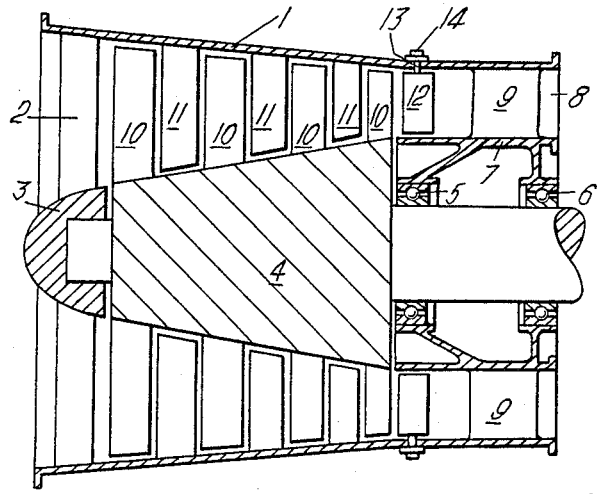
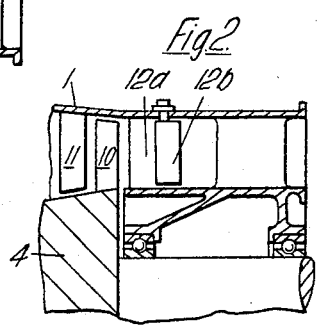
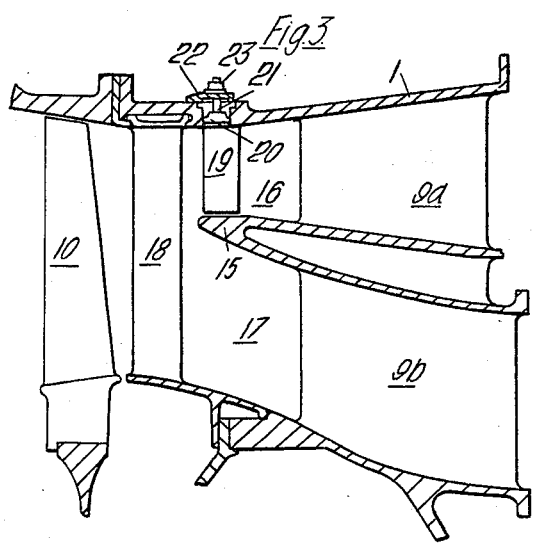
Inventor
PAUL ERNEST COLIN RICHARDSON
By
Attorneys United States Patent Office
3,285,567
Patented Nov. 15, 1966

1

3,285,567
AXIAL FLOW TURBINES AND COMPRESSORS
Paul Ernest Colin Richardson, Bristol, England, assignor to Bristol Siddeley Engines Limited, Bristol, England, a British company
Filed Nov. 16, 1964, Ser. No. 411,196
Claims priority, application Great Britain, Nov. 29, 1963, 47,274/63
3 Claims. (Cl. 253—59)

When an axial flow turbine or compressor has outlet ducting defined partly or completely by a surface which is non-coaxial with respect to the rotor axis, that is to say is not a surface of revolution about the rotor axis, it is possible for the circumferential distribution of the flow of working fluid through the rotor blades to become non-uniform in a manner such as to cause damaging vibration of the rotor blades. For example, there may be a few relatively large radial vanes immediately downstream of the turbine or compressor which would slow down the fluid flow in regions axially aligned with the vanes, or the fluid leaving the compressor or turbine may be discharged through two circumferentially spaced outlets so that the fluid velocity in the regions axially aligned with the outlets would be greater than elsewhere.

My U.S. application No. 163,669, filed January 2, 1962, relates to means for ameliorating such conditions by providing between the affected rotor blades and the non-coaxial surface which is the cause of the disturbance a ring of stator blades constructed so as to have a suitable circumferential variation of shape, angle of attack, or spacing, so as to reduce or eliminate the vibration caused by the non-coaxial surface.

According to the present invention an axial flow turbine or compressor includes a final row of stator blades arranged to permit individual adjustment of their exit angles. Preferably, all the blades of the final ring of stator blades are adjustable, but the adjustability may alternatively be confined to blades lying in one or more segments of a ring, that is to say to a row of the blades which do not form a complete ring.

Such an arrangement permits each machine of a production series to be tuned individually to produce the best results, and also permits machines of identical construction to be used with outlet ducting of different shapes, the exit angles of the final stator blades being adjusted to suit the outlet ducting to be used. Also, the arrangement can be used in a prototype machine for the purpose of determining the best arrangement of the correcting blades, the production machines being then provided with corresponding non-adjustable blades.

The invention is particularly applicable to axial flow compressors constituting the low-pressure compression stage of a by-pass type gas turbine engine, that is to say an engine in which part of the air compressed by the low-pressure compressor is further compressed in a high pressure compressor, heated by combustion and expanded in a turbine system driving the compressors, while the remainder of the air by-passes the high pressure compressor and the rest of the system. It may be desired to provide such an engine either with a coaxial duct taking the by-passed air to a jet nozzle at the rear of the engine, or with ducting from which by-pass air is discharged through one or more lateral outlets, or again there may be outlet ducts with different arrangements of outlets which it may be desired to use with an engine of the same basic construction. Such different outlet ductings for the by-pass air can produce differences in he flow distribution through the moving blades of the compressor some of which may excite dangerous vibrations in the blades at certain rotational speeds of the machine.

2

To permit reduction or elimination of such vibrations the low pressure compressor is provided, according to the invention, at least in that part of its outlet passage conveying the by-pass air, with a final row of stator blades arranged to permit individual adjustment of their exit angles.

Adjustable stator blades in accordance with this invention may also be included in the outlet from a turbine. For example, in a by-pass type gas turbine engine and in some other forms of engine, the gas discharge from the turbine may lead to a forked exhaust duct providing lateral outlets, in which case the adjustable stator blades will be used to reduce or eliminate any rotor blade vibration which may be induced by the uneven circumferential flow distribution caused by the lateral outlets.

The invention is illustrated by the examples shown in the accompanying drawings.

In the drawings:

FIGURE 1 is a somewhat diagrammatic longitudinal section through an axial flow compressor having a final row of stator blades of which the angles of incidence are individually adjustable;

FIGURE 2 illustrates an alternative arrangement in a compressor similar to that shown in FIGURE 1;

FIGURE 3 is a longitudinal section through the outlet passage of a compressor for use in a by-pass type gas turbine engine;

Figure 4:
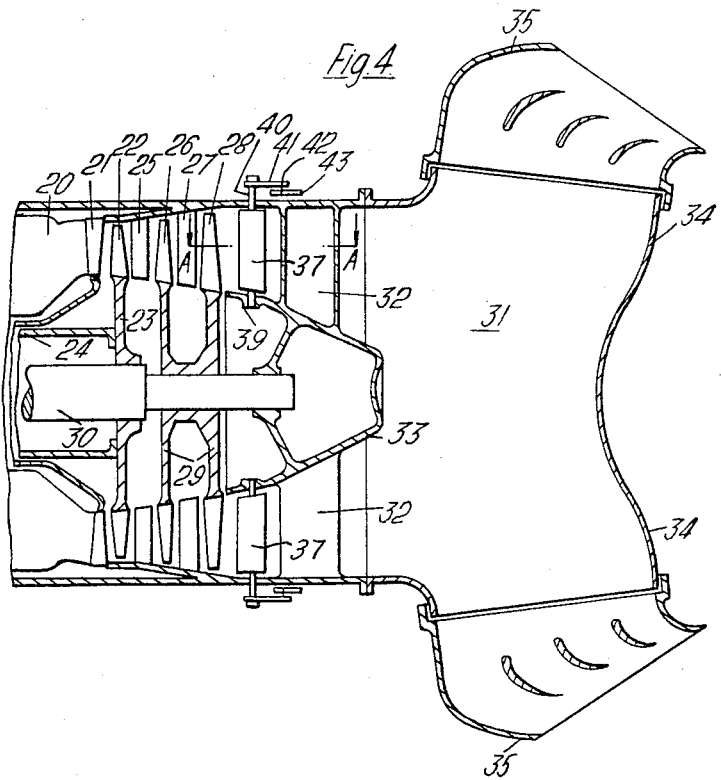
FIGURE 4 is a longitudinal section illustrating somewhat diagrammatically an application of the invention to the turbine of a gas turbine engine of which the exhaust gases are discharged through a pair of rotatable nozzles.

The compressor shown in FIGURE 1 comprises a stator casing 1 having a row of inlet guide vanes 2 supporting a front bearing 3 for a rotor 4 which is mounted at its rear end in bearings 5 and 6 carried by stator structure 7 defining the inner boundary of an annular outlet passage 8. The structure 7 is connected to the casing 1 by a few relatively large vanes 9 of streamline shape in section extending across the outlet passage 8. There may for example be four such vanes.

The rotor 4 carries four rings of moving blades 10 between which there are three rings of stator blades 11 carried by the casing 1. A final ring of stator blades 12 is mounted in the casing by means of stems 13 passing through the casing so that their angles of incidence to the flow of working fluid through the compressor may be individually adjusted. There may for example be thirty or more of such blades. Suitable locking means 14 on the outside of the casing permit the blades to be locked in their adjusted positions. The adjustment is effected in accordance with the principles described in pending patent application No. 163,669 to reduce or eliminate any vibration of the rotor blades which may arise from the presence of the vanes 9 or of ducting attached to the outlet end of the compressor.

In the modified arrangement shown in FIGURE 2 the stator blades of the final ring comprise a non-adjustable leading edge part 12a and an adjustable trailing edge part 12b. This permits the exit angle to be altered without a corresponding alteration of the inlet angle.

FIGURE 3 shows one way in which the invention may be applied to a compressor in which the stator structure includes a circular wall 15 dividing the outlet into an outer annulus 16 and an inner annulus 17. When incorporated in a by-pass type gas turbine, the outer annulus carries the by-pass air and may be connected either to an annular duct coaxial with the compressor, in which case the duct is unlikely to be the cause of flow variations through the rotor blades which might excite them to dangerous vibration, though vanes 9a in the outer annulus which are few in number, for example four, and relatively large, may cause such an effect. Alternatively, the outer annulus may be connected to ducting having one or more non-coaxial outlets; in that case, unless there is a substantial length of coaxial passage, undivided by vanes or stator blades, between the outlets and the rotor blades, variations of flow through the latter will be caused which may excit vibration in them. The inner annulus 17 conveys air to a high-pressure compressor, which is unlikely to cause upstream flow disturbances, but vanes 9b which are in effect continuations of the vanes 9a crossing the annulus 17 may do so.

In this example the last ring of rotor blades 10 is followed by a ring of non-adjustable stator blades 18 extending fully across the outlet passage upstream of the dividing wall 15, and there is a final ring of individually adjustable stator blades 19 extending only across the outer annular passage 16. Each blade 19 has a stem portion 20 of circular cross-section in a bore in the stator casing 1, from which there is a square-sectioned or splined extension 21 carrying a vernier plate 22 seating on the casing. A nut 23 permits the blade to be locked in position after adjustment. There may be for example thirty or more such blades, more or less equally distributed around the annulus 16, or there may be one or more groups (i.e., non-circular rows) of such blades each in a region in which a correction of the flow distribution is or may be required.

The non-adjustable stator blades 18 may be uniformly spaced and have a normal amount of camber and twist to turn the air discharged from the rotor blades 10 into the axial direction. They may alternatively however be construed to have a circumferential variation of turning effect if this is required to offset the effect of flow disturbances caused by the vanes 9b and this variation may simultaneously wholly or partly offset the effect of flow disturbances caused by the vanes 9a, leaving the adjustable blades 19 free to deal with the effects of ducting forming a continuation of the outer annulus 16. The blades 19 accordingly preferably have no camber or twist and are adjustable through a range of about 10° in both directions from a mean axial flow setting.

Alternatively the blades 19 may have twist, if this will assist compensation of the flow pattern produced by the non-coaxial outlet duct, and/or camber may be introduced so that the straightening of the compressor flow is shared between the fixed stator ring 18 and the adjustable blades 19. To correct for flow disturbances caused by outlet ducting with an outlet opening at each side of the engine, the blades 19 may be arranged in two rows extending respectively over arcs at the top and bottom of the annulus 16.

Instead of the stator blades 18 being fixed, they could also be adjustable for incidence within a limited range.

The engine of which the rear end part is shown in FIGURE 4 comprises a combustion system 20 from which products of combustion pass through a row of nozzle inlet guide vanes 21 to the moving blades 22 of a high-pressure turbine 23 which drives a high-pressure compressor, not shown, through a hollow shaft 24. After leaving the blades 22 the gases pass through the stator and rotor blades 25, 26, 27 and 28 of a two-stage low-pressure turbine 29 which drives a low-pressure compressor, not shown, through a shaft 30 passing coaxially through the shaft 24. The exhaust gases leaving the second stage rotor blades 28 of the low-pressure turbine pass into an exhaust duct 31 between a small number, for example seven, of large vanes 32 supporting a housing 33 for the bearing system of the shaft 24 and 30. The exhaust duct 31 is forked to provide two lateral outlets 34 on each of which is mounted for rotation a gas deflecting nozzle 35.

Figure 5:
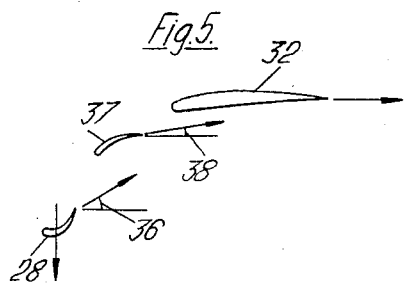
FIGURE 5 is a section on the line A in FIGURE 4 drawn to a larger scale and showing the shapes of the blades.

In an engine of this kind the gases leaving the last ring of moving turbine blades 28 would normally have a certain amount of circumferential swirl, at least in some running conditions, and the vanes 32 would be of aerofoil shape in section such as to eliminate this swirl as far as practicable in the interest of reducing aerodynamic losses in the exhaust duct 31 and the nozzles 35. In this example, however an additional ring of stator blades 37 is provided to reduce the swirl of the gas discharge before the gas reaches the vanes 32. The ring may for example comprise forty or more blades. This enables the power of the low-pressure turbine to be increased by using rotor blades 28 which discharge the gas with increased swirl, as indicated by the relatively large angle 36 in FIGURE 5, without seriously increasing the losses in the exhaust duct 31. The stator blades 37 reduce the swirl angle to a moderate value, indicated by the angle 38 in FIGURE 5, which can be dealt with satisfactorily by the relatively few large vanes 32.

The invention is applied to this example by mounting the blades 37 in a manner allowing their angles of incidence to the axial direction to be adjusted individually. By making such individual adjustments it is possible to prevent the rotor blades 28 being set in vibration to a dangerous extent by disturbances of the flow pattern caused by the vanes 32, the forked shape of the exhaust duct 31 or the presence of the nozzles 35.

In some cases the amount of swirl of the exhaust gases leaving the last ring of moving turbine blades 28 will vary appreciably with the operating condition of the engine. To deal with this the blades 37 of the additional ring may have a common incidence variation dependent upon the engine operating condition superimposed upon their initial adjustment. For this purpose, as indicated in FIGURE 4, each blade 7 has inner and outer trunnions 39 and 40 and the outer trunnion is adjustably attached to an arm 41 of which the other end carries a pin 42 engaging a slot in a ring 43 which may be turned in dependence upon a suitable engine operation parameter to impart a suitable equal incidence changes to all the blades 37.

In general the presence of a non-coaxial surface in the outlet ducting of a compressor, and to a lesser though sometimes appreciable extent in a turbine, is liable to cause vibration of rotor blades through giving rise to a non-uniform circumferential distribution of fluid flow. In order to reduce or eliminate any tendency for the non-uniform flow distribution to cause vibration of the rotor blades, the adjustable rotor blades should be varied so as to introduce a tendency for the flow to diverge downstream in regions in which the non-coaxial surface or surfaces tend to reduce the flow velocity. Conversely, in regions where the flow velocity is greater than elsewhere owing to the non-coaxial surface or surfaces, the adjustable blades should be varied so as to cause the flow through them to converge downstream. The adjustments of the final stator blades will tend to even out the circumferential distribution of flow through the rotor blades and will therefore reduce or eliminate the tendency for dangerous vibration to be induced in the rotor blades. It is not necessary however to provide complete compensation of narrow regions of seriously disturbed flow but only to provide a periodic, preferably sinusoidal, variation at the fundamental frequency of the flow disturbance or at an integral multiple of it and at a suitable phase relation to it to oppose the rotor blade vibrations which it would have produced.

I claim:

1. A turbine having a rotor with rotor blades, a stator with stator blades which co-operate with the rotor blades, and outlet ducting defined at least partly by a surface which is non-coaxial with respect to the axis of the machine, the last ring of rotor blades being followed immediately downstream by a ring of stator blades of which at least some of the blades forming a row are individually adjustable.

2. A turbine according to claim 1, in which the said non-coaxial surfaces are vanes supporting a bearing for the rotor.

3. A turbine according to claim 1, in which the said non-axial surfaces are circumferentially spaced lateral flow outlets.

References Cited by the Examiner

UNITED STATES PATENTS

| | | | |
|---|---|---|---|
| 2,854,211 | 9/1958 | Bendersky | 230—114 |
| 2,945,672 | 7/1960 | Wagner et al. | 60—35.6 |
| 2,962,258 | 11/1960 | Wagner | 253—59 |
| 2,990,108 | 6/1961 | Lundquist | 230—122 |
| 3,112,913 | 12/1963 | Irwin | 253—59 |
| 3,209,535 | 10/1965 | Marchant et al. | 60—35.55 |

FOREIGN PATENTS

| | | |
|---|---|---|
| 520,194 | 6/1953 | Belgium. |
| 899,619 | 10/1944 | France. |
| 847,430 | 8/1952 | Germany. |
| 595,357 | 12/1947 | Great Britain. |
| 704,669 | 2/1954 | Great Britain. |

MARK NEWMAN, *Primary Examiner.*

HENRY F. RADUAZO, *Examiner.*